United States Patent [19]

Kinugasa et al.

[11] Patent Number: 6,032,461
[45] Date of Patent: Mar. 7, 2000

[54] EXHAUST EMISSION CONTROL APPARATUS FOR INTERNAL COMBUSTION ENGINE

[75] Inventors: Yukio Kinugasa; Kouhei Igarashi, both of Susono; Takaaki Itou, Mishima, all of Japan

[73] Assignee: Toyota Jidosha Kabushiki Kaisha, Aichi, Japan

[21] Appl. No.: 09/065,016

[22] PCT Filed: Oct. 30, 1996

[86] PCT No.: PCT/JP96/03184

§ 371 Date: Apr. 20, 1998

§ 102(e) Date: Apr. 20, 1998

[87] PCT Pub. No.: WO97/16632

PCT Pub. Date: May 9, 1997

[30] Foreign Application Priority Data

Oct. 30, 1995 [JP] Japan .................................... 7-281784
Feb. 22, 1996 [JP] Japan .................................... 8-035057

[51] Int. Cl.[7] .................................................... F01N 3/00
[52] U.S. Cl. .............................. 60/295; 60/285; 701/201
[58] Field of Search ........................... 60/276, 277, 285, 60/286, 295, 297; 701/201

[56] References Cited

U.S. PATENT DOCUMENTS 5,319,930  6/1994  Shinzawa et al. ..................... 60/286
5,711,149  1/1998  Araki ..................................... 60/278
5,740,669  4/1998  Kinugasa et al. ..................... 60/285
5,815,824  9/1998  Saga et al. ............................ 701/22

FOREIGN PATENT DOCUMENTS 5-59929    3/1993  Japan .
6-50130    2/1994  Japan .
7-34854A   2/1995  Japan .

*Primary Examiner*—Thomas Denion
*Assistant Examiner*—Binh Tran
*Attorney, Agent, or Firm*—Kenyon & Kenyon

[57] ABSTRACT

To provide an exhaust gas purifying system for an internal combustion engine capable of executing an optimal regenerative operation by predicting a temperature of an absorbent based on running state information.

There are predicted the amount of nitrogen oxides ($NO_x$) to be absorbed by an absorbent 125 incorporated in a catalyst 124 and the temperature of the absorbent, based on the running state information obtained from a car navigation system 141 or traffic information service receiver 142, and the regenerative operation schedule is determined based on the prediction. Thus, the regenerative operation is conducted at the timing where $NO_x$ has been duly absorbed by the absorbent and the absorbent temperature is lower than a predetermined temperature, so that the leakage of $NO_x$ into the exterior of a vehicle can be restrained.

13 Claims, 13 Drawing Sheets

EXHAUST EMISSION CONTROL APPARATUS FOR INTERNAL COMBUSTION ENGINE

TECHNICAL FIELD

The present invention relates to an exhaust gas purifying system for an internal combustion engine or, more particularly, to an exhaust gas purifying system for an internal combustion engine in which a poisonous gas component in the exhaust gas is trapped, stored and periodically removed.

BACKGROUND ART

Various types of exhaust gas purifying systems, for purifying the exhaust gas emitted from an internal combustion engine, are used according to the properties of the exhaust gas, and many of them trap a poisonous component contained in the exhaust gas and require regeneration operation at appropriate time intervals.

For example, an exhaust gas purifying system, for a gasoline engine or, especially, for a gasoline engine which executes lean burning for most of the running period, except accelerating periods or the like, which absorbs nitrogen oxide for the lean burning period and releases the absorbed nitrogen oxide for the short rich burning period has already proposed (Refer to International Publication No. WO93/07363).

The above-mentioned exhaust purifying system absorbs nitrogen oxide contained in the exhaust gas in an absorbent incorporated in the exhaust gas purifying system for the lean burning period, which accounts for most of the running period, and executes a regeneration operation which releases the nitrogen oxide from the absorbent by increasing an amount of fuel to make air-fuel ratio rich when it is determined that the absorbing power has deteriorated. Note, nitrogen oxide released during the regeneration operation is not directly emitted into the air because it is deoxidized by unburned hydrocarbon and carbon monoxide and converted to nitrogen gas, carbon dioxide and water in the exhaust gas with rich air-fuel ratio. The nitrogen oxide released for the regeneration operation is dioxidized by unburned hydrocarbon in the exhaust gas, the air-fuel ratio thereof being rich, and thus is converted into nitrogen gas, carbon dioxide and water. The nitrogen oxide, therefore, is not emitted into the air.

However, if the remaining absorbing power of the absorbent is evaluated based on the integrated value of the product of the intake air flow rate which is proportional to the amount of nitrogen dioxide in the exhaust gas and the engine load or in a more simplistic manner, based on the integrated value of the engine speed, and a regeneration operation is executed when it is determined that the remaining absorbing power decreases below a fixed level, it is not avoidable that the nitrogen oxide is emitted in the air depending on the exhaust gas temperature.

Because the air-fuel ratio in the absorbent gradually changes from the lean state to the rich state when the air-fuel ratio is controlled from the lean state to the rich state, nitrogen oxide is not completely deoxidized and is liable to be emitted in the air before the actual air-fuel ratio has been completely transferred to the rich state.

However, it is known that the discharge amount of nitrogen oxide when switching the air-fuel ratio from rich to lean depends mainly on the temperature of the absorbent and becomes almost zero when the temperature of the absorbent is lower than 200° C.

Therefore, the present applicant has already proposed stopping the regeneration operation as long as the absorbent has a residual absorption power when the temperature of the absorbent (or the exhaust gas) rises over the temperature where the regeneration operation is permitted.

However, the regeneration operation of the exhaust gas purifying system based on the current temperature of the absorbent is not always optimal.

Namely, even if the regeneration timing of the exhaust gas purifying system is controlled based on the current temperature of the exhaust gas in addition to the integrated value of the engine speed, the nitrogen oxide is liable to be emitted into the air when the exhaust gas temperature suddenly rises while the exhaust gas purifying system is regeneration, and when the exhaust gas temperature becomes the temperature where regeneration operation is permitted while the nitrogen oxide is being absorbed, the fuel consumption may unnecessarily increase to enrich the air-fuel ratio.

On the other hand, in an exhaust gas purifying system for a diesel engine, the particulate filter thereof, for trapping particulates (carbon particles) contained in the exhaust gas, is periodically regenerated as has been proposed (Japanese Unexamined Patent Publication (Kokai) No. 1-318715).

Namely, for the diesel engine, a particulate filter is installed in the exhaust system in order to remove the particulates from the exhaust gas before the gas is emitted into the atmosphere. Because the trapping power of the particulate filter is limited, it is necessary to remove the particulate at appropriate times.

Therefore, the above described exhaust gas purifying system proposes not only to promote the spontaneous burning off of the particulates by adding catalyst in the particulate filter, but also the burning-off of the particulates by continuing the reaction between the particulates and the nitrogen dioxide which is converted from nitrogen monoxide, by an oxidation catalyst installed upstream of the particulate filter, when the exhaust gas temperature is not so high.

Because conversion of nitrogen monoxide into nitrogen dioxide by the oxidation catalyst, however, requires that the exhaust gas temperature is within a predetermined range, the particulates cannot be burned off when the exhaust gas temperature is out of the predetermined range.

Therefore, it has been proposed to promote the burning off of the particulates by raising the exhaust gas temperature into the predetermined temperature range, by heating with a light oil burner or an electric heater, by closing the intake air, or by combining the above, when it is determined that the exhaust gas temperature is out of the predetermined range based on the rotational speed and the load of the diesel engine.

Nevertheless, when the exhaust gas temperature shifts into the predetermined range and it becomes possible to remove the particulate without heating by the light oil burner or the like after it is determined that the heating with the light oil burner or the like is necessary because the exhaust gas temperature is out of the predetermined range, the fuel consumption rate is unavoidably deteriorated due to the unnecessary heating.

DISCLOSURE OF THE INVENTION

Accordingly, the object of the present invention is to provide an exhaust gas purifying system, for an internal combustion engine, which can optimally execute a regeneration operation without deteriorating the fuel consumption rate by predicting a future state of the exhaust gas according to an information fetched from a navigation system or the like.

According to this invention, there is provided an exhaust gas purifying system comprising a trapping means for trapping a poisonous component contained in the exhaust gas emitted from an internal combustion engine, a removing means for removing the poisonous component trapped by said trapping means from the trapping means, an exhaust gas state predicting means for predicting a future state of the exhaust gas emitted from the internal combustion engine, a regeneration timing determining means for determining a regeneration timing to regenerate said trapping means using said removal means based on the state of the exhaust gas predicted by said exhaust gas state predicting means, and a regeneration executing means for executing the regeneration of said trapping means by said removal means at the regeneration timing determined by said regeneration timing determining means.

BEST MODE FOR CARRYING OUT THE INVENTION

Figure 1:
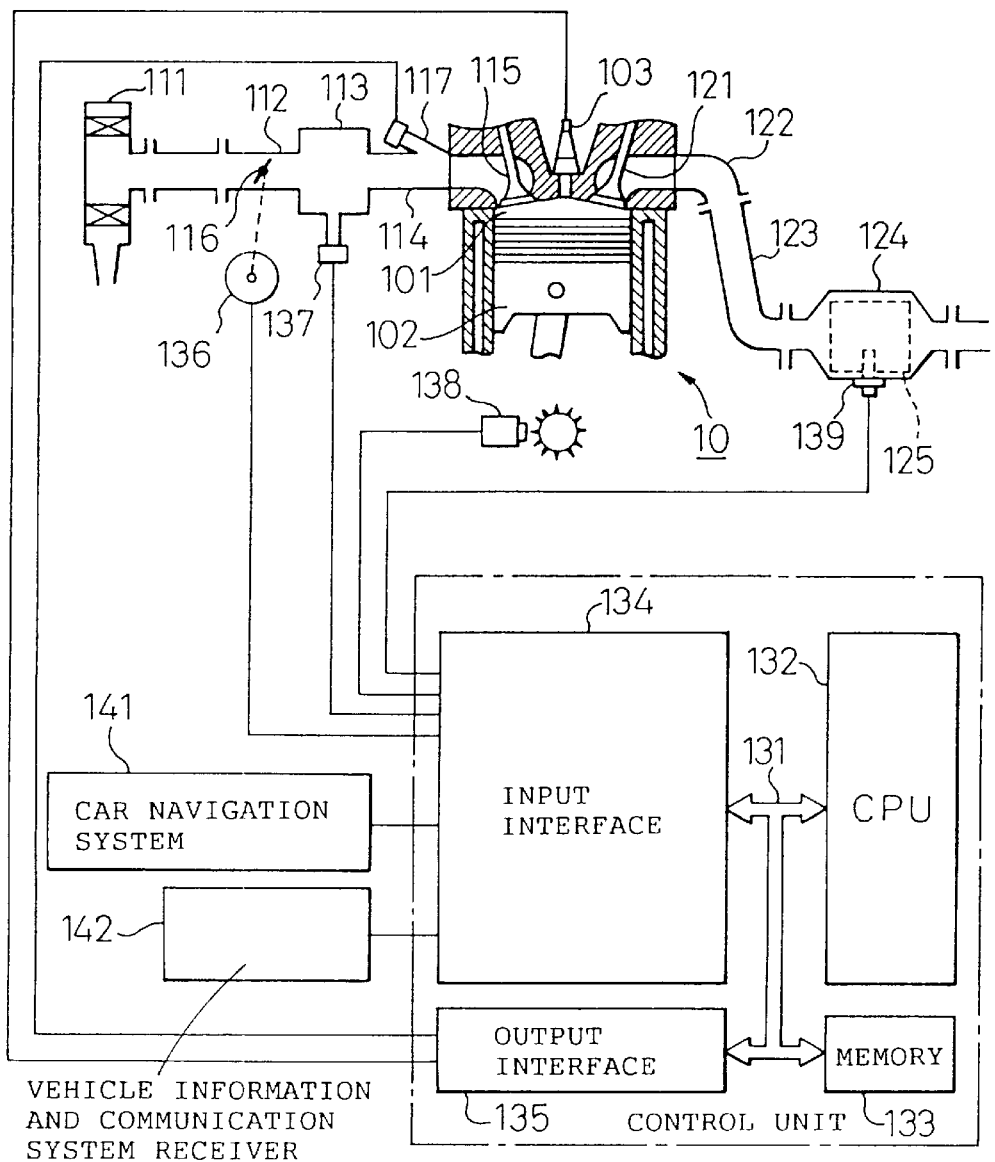
FIG. 1 is a configuration diagram of an embodiment of an exhaust gas purifying system for a gasoline engine according to the present invention.

FIG. 1 is a configuration diagram according to the present invention applied to a gasoline engine.

For the gasoline engine 10, intake air is supplied through an air cleaner 111, an intake pipe 112, a surge tank 113, a branch pipe 114 and an intake valve 115.

A throttle valve 116 is mounted in the intake pipe 112 to control the amount of the intake air supplied to the gasoline engine 10. Also, a fuel injection valve 117 is installed in the branch pipe 114 to inject the fuel into the intake air.

The mixture supplied to a combustion chamber 101 is compressed by the rising of a piston 102 while the piston 102 is moving up, and ignited by a spark plug 103 to be burned near the top dead center so that the piston 102 is moved down to generate driving power.

After burning, the exhaust gas is supplied to an exhaust gas purifying unit 124, through an exhaust valve 121, an exhaust manifold 122 and an exhaust pipe 123, so that it is purified in the purifying unit 124.

The exhaust gas purifying unit 124 contains nitrogen oxide absorbent 125. When the amount of residual oxygen is small in the exhaust gas, the nitrogen oxide is absorbed, while when the amount of residual oxygen in the exhaust gas is large, the nitrogen oxide absorbed is released.

This exhaust gas purifying unit 124 is controlled by a control unit 13 which is a microcomputer system. The control unit 13 consists of not only a bus 131 but also a CPU 132, a memory 133, an input interface 134 and an output interface 135.

To the input interface 134, a throttle opening sensor 137 which detects the opening of the throttle valve 116, an intake air pressure sensor 137 which detects the pressure in the surge tank 113, a crank angle sensor 138 which detects the rotational speed of the gasoline engine 19 and an absorbent temperature sensor 139 which detects the temperature of the absorbent 125 contained in the exhaust gas purifying unit 124 are connected.

Further, at least one of a car navigation system 141 and a vehicle information and communication system receiver 142 is also connected to the input interface, and the information on running conditions obtained from the car navigation system 141 and the vehicle information and communication system receiver 142 is fetched into the control unit 133.

To the output interface 135, the spark plug 103 and the fuel injection valve 117 are connected and controlled by an ignition command and a fuel injection valve opening command output from the control unit 13.

Figure 2:
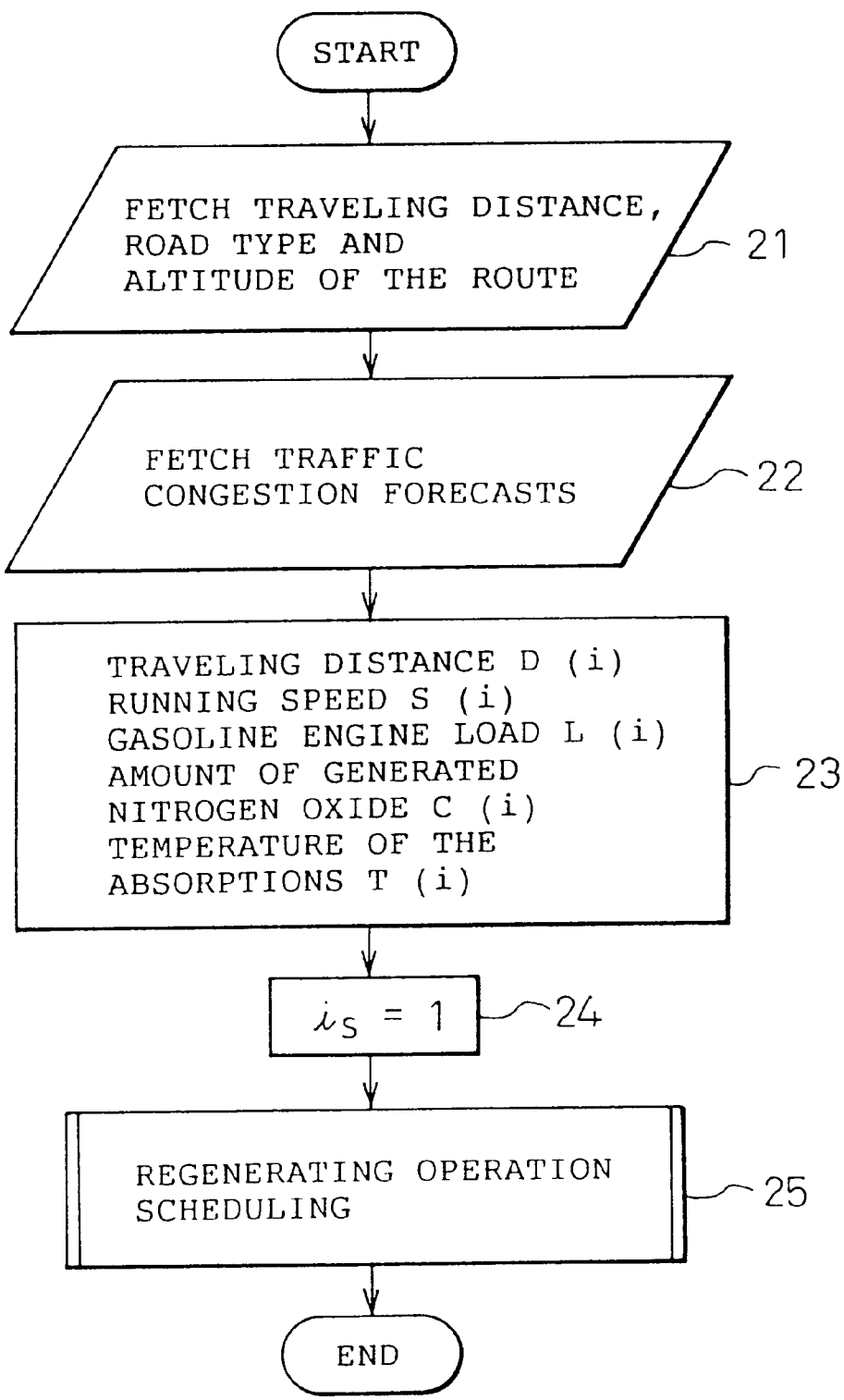
FIG. 2 is a flowchart of a scheduling routine for an exhaust gas purifying system for a gasoline engine.

FIG. 2 is a flowchart of a scheduling routine executed in the control unit 13 before the vehicle begins running, and information on the route found by the car-navigation system 141, such as a running distance, a road type (express road or normal road), a running height, etc., is fetched at step 21.

A traffic congestion forecast, traffic control information, etc. received by the vehicle information and communication system receiver 142 are fetched at step 22.

At step 23, the route to the destination is divided into $i_{max}$ sections according to the information and the traffic congestion forecast, and then a running distance D(i), a running speed S(i), a load of the gasoline engine L(i), an amount of generated nitrogen oxide C(i), a temperature of the absorbent T(i), etc. are predicted for each running section i ($1 \leq i \leq i_{max}$).

At step 24, in order to determine the regeneration timing of the exhaust gas purifying system for all running sections, a running section index $i_s$ is set to "1" as the initial value, and the regeneration operation scheduling routine for the exhaust gas purifying system is executed at step 25 to terminate the routine.

Figure 3:
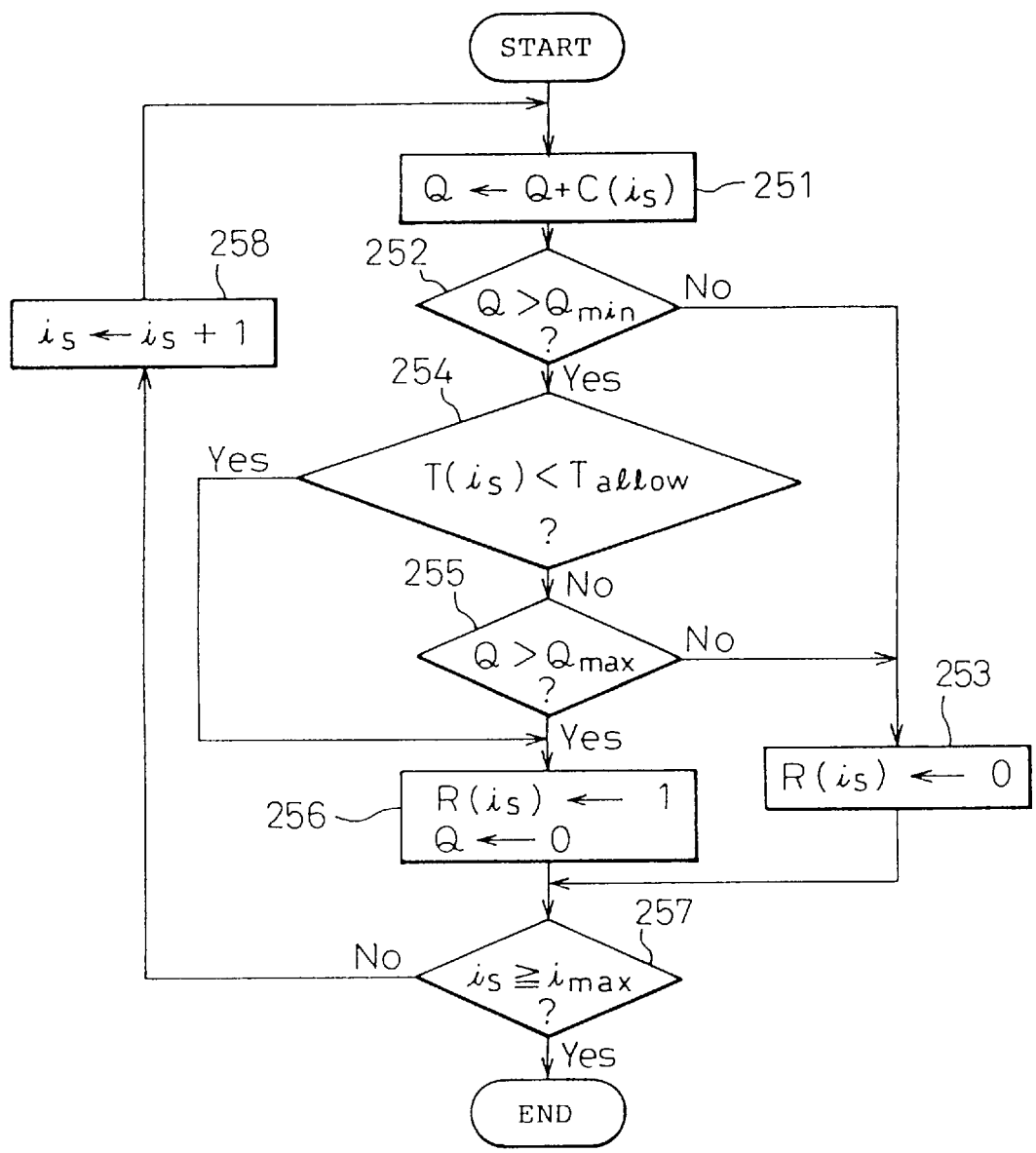
FIG. 3 is a flowchart of a regeneration operation timing determining routine.

FIG. 3 is a flowchart of the regeneration operation timing determining routine executed at step 25. The amount of nitrogen oxide $C(i_s)$ predicted to be generated in the running section "$i_s$" is added to the amount of nitrogen oxide Q absorbed by the exhaust gas purifying system often running in the preceding running section to determine the amount of nitrogen oxide Q absorbed by the exhaust gas purifying system after running in the running section "$i_s$".

It is determined whether or not the amount of nitrogen oxide Q after running through section "$i_s$" is larger than a minimum absorption amount $Q_{min}$ (for example, 10%).

When the determination at step 252 is negative, that is, when it is determined that nitrogen oxide is not absorbed in the exhaust gas purifying system, the control proceeds to step 253 where the regeneration operation flag $R(i_s)$ for the running section "$i_s$" is set to "0" because the regeneration operation is not required for the running section "$i_s$".

When the determination at step 252 is affirmative, that is, when it is determined that nitrogen oxide is absorbed in the exhaust gas purifying system, the control proceeds to step 254 where it is determined whether or not the absorbent temperature $T(i_s)$ for the running section "$i_s$" is lower than the temperature where the regeneration operation is permitted $T_{allow}$.

The reason why the determination is done is that nitrogen oxide is liable to be emitted into the air by the regeneration operation when the absorbent temperature rises above the temperature, where the regeneration operation is permitted, $T_{allow}$ though it is necessary that the absorbent temperature is higher than the activation temperature, as described above.

When the determination at step 254 is negative because it is predicted that the absorbent temperature $T(i_s)$ for the running section is over the temperature where the regeneration operation is permitted, the control proceeds to step 255 where it is determined whether or not the amount of nitrogen oxide absorbed after running in the running section "$i_s$" is larger than a maximum absorption amount $Q_{max}$ (for example, 70%).

When the determination at step 255 is negative, that is, when the absorption power has a margin, the control proceeds to step 253 as the regeneration operation is not performed.

When the determination at step 255 is affirmative, that is, when the amount of nitrogen oxide Q after completing running the running section "$i_s$" exceeds the maximum absorption amount $Q_{max}$, and when the determination at step 254 is affirmative, that is, when the regeneration operation is permitted for the running section "$i_s$", then the control proceeds to step 256 for setting the regeneration operation flag $R(i_s)$ to "1" for the running section "$i_s$" and resetting the amount of nitrogen oxide Q.

After completing processing at steps 253 and 256, it is determined whether or not the running section index $i_s$ has reached the maximum value $i_{max}$ at step 257, and the control returns to step 251 after the section index is incremented at step 285 when the determination at step 257 is negative. Note, when the determination at step 257 is affirmative, this routine is directly terminated.

Figure 4:
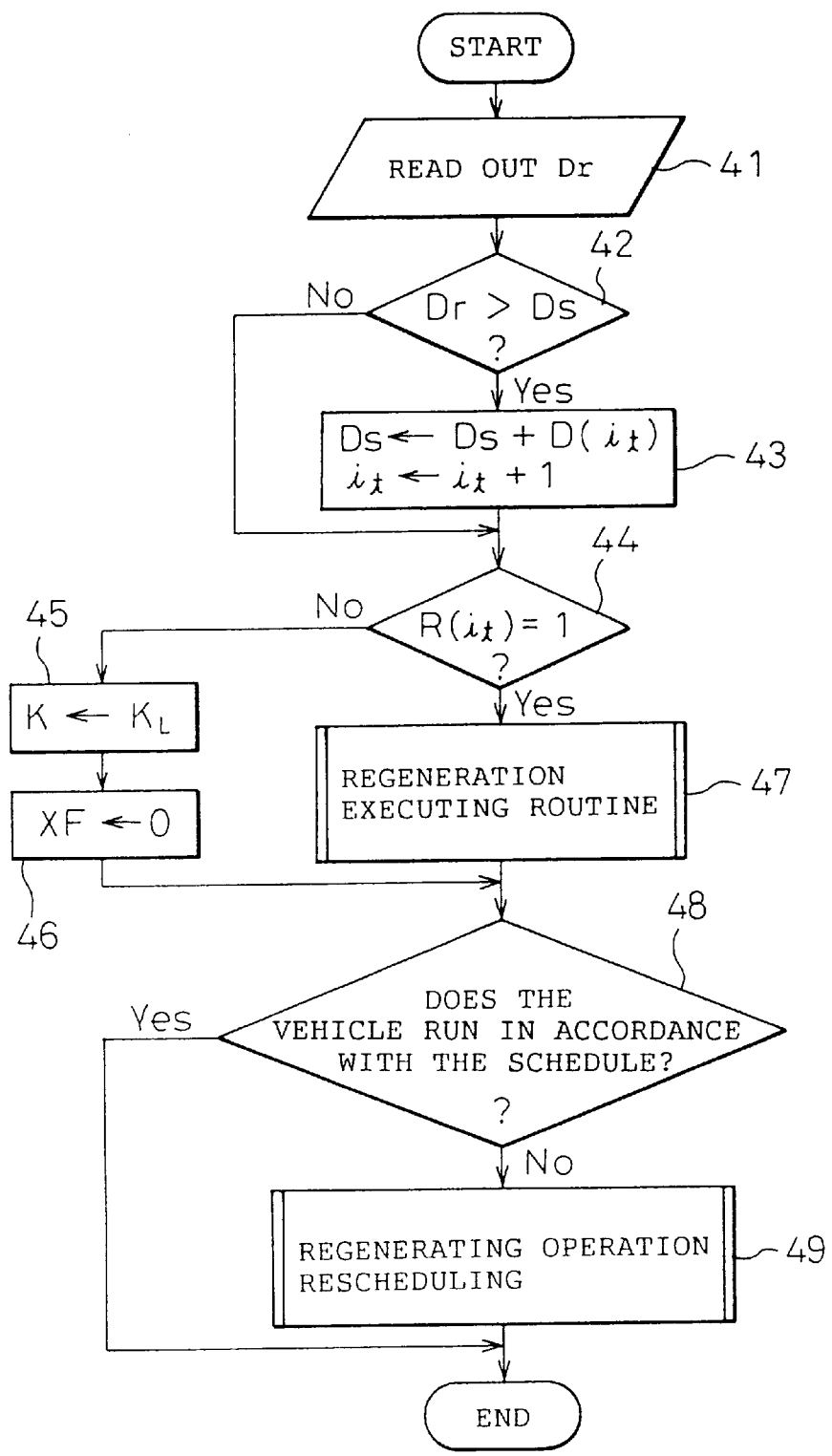
FIG. 4 is a flowchart of a regeneration operation routine.

FIG. 4 is a flowchart of the regeneration operation routine executed after the vehicle begins running, and this routine is executed as an interrupt routine every predetermined time interval.

The actual running distance after the vehicle begins running $D_r$ is read out, for example, from the trip meter at step 41 and it is determined whether or not the actual running distance is larger than the predicted running distance $D_s$ ($i_t$) up to the section it. Note, the running section $i_t$ and the predicted running distance $D_s$ are set to "0" in the initialization routine which is not shown.

When the determination at step 42 is affirmative, that is, when the running section $i_t$ has been completely covered, the control proceed to step 44 after the predicted distance $D_s$ is renewed with following equation and the section index $i_t$ is incremented at step 43.

$$D_s \leftarrow D_s + D(i_t)$$

$$i_t \leftarrow i_t + 1$$

Note, when the determination at step 42 is negative, the control proceeds directly to step 44.

It is determined that whether or not the regeneration execution flag $R(i_t)$ for the running section $i_t$ is "1" at step 44. When the determination at step 44 is negative, that is, when the vehicle is running in the running section for which the regeneration operation is not executed, the control proceeds to step 48 after the air-fuel ratio correction coefficient K is set to a value $K_L$ less than "1.0" (for example, "0.7") in order to execute the lean burning, and the burning state flag XF is set to "0" which indicates that the lean burning is executing.

When the determination at step 44 is affirmative, that is, when the vehicle is running in the section for which the regeneration operation is performed, the control proceeds to step 48 after the regeneration operation is executed at step 47.

It is determined whether or not the vehicle is moving in accordance with the predicted schedule.

This determination can be done by determining whether or not the actual values of the speed, the gasoline engine load (for example, the intake manifold pressure) and the absorbent temperature agree with the corresponding predicted values within the predetermined limits.

When the determination at step 48 is negative, that is, when the vehicle does not run according to schedule, the routine is terminated after the scheduling routine shown in FIG. 3 is again executed at step 49. When the determination at step 48 is affirmative, that is, when the vehicle runs according to schedule, this routine is directly terminated.

Figure 5:
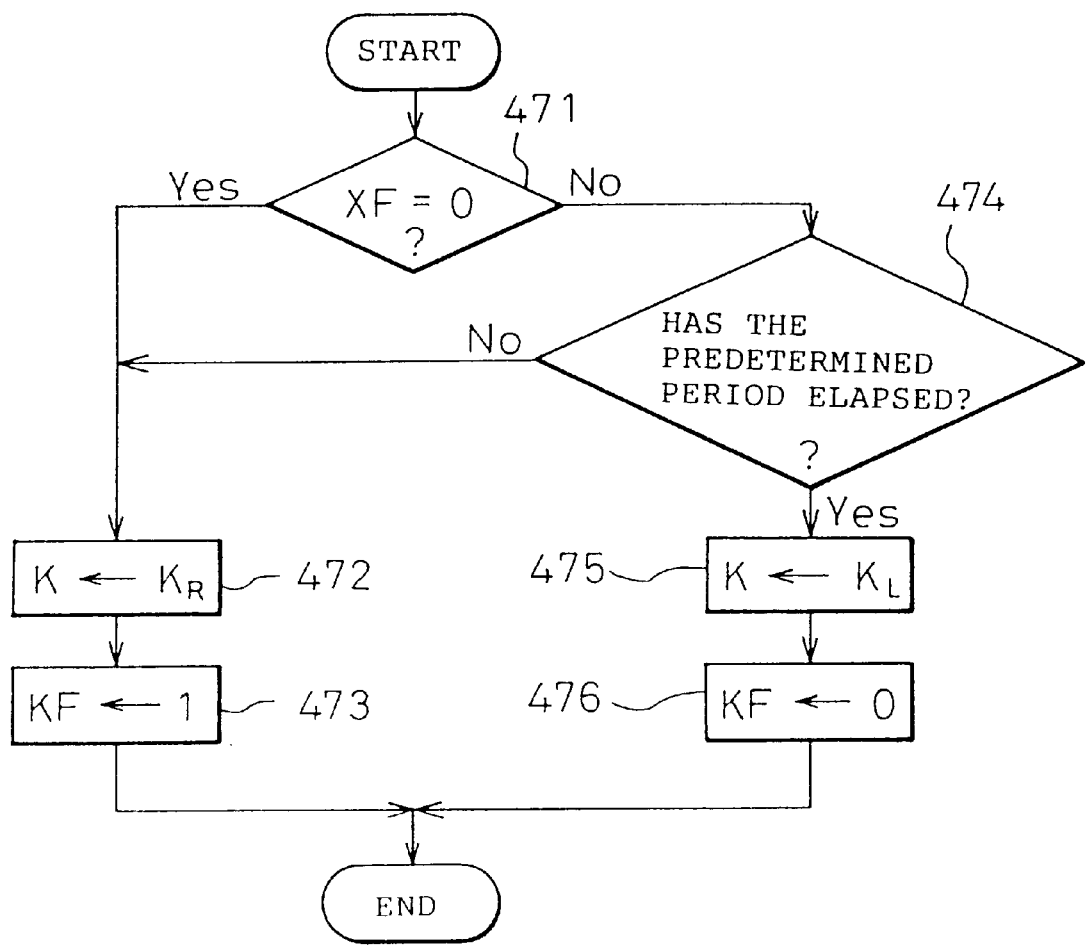
FIG. 5 is a flowchart of a regeneration execution routine.

FIG. 5 is a flowchart of a regeneration executing routine executed in step 47. It is determined whether or not the burning state flag XF is "0" at step 471.

When the determination at step 471 is affirmative, that is, when the burning has been under the lean state, the routine is terminated after the air-fuel ratio correction coefficient K is set to a value $K_R$ larger than "1.0" (for example, "1.3") at step 472, and the burning state flag XF is set to "1" which indicates that the rich burning is executing.

When the determination at step 471 is negative, that is, the regeneration operation has already begun, it is determined whether or not the period required for the regeneration operation has elapsed at step 474. When the determination is negative, the control proceeds to step 472, while when the determination is affirmative, the control proceeds to step 475.

That is, when the regeneration operation is regarded as being completed, this routine is terminated after the air-fuel ratio correction coefficient K is set to $K_L$ to restore the burning state to the lean burning at step 475, and the burning state flag XF is set to "0" which indicates that the lean burning is executing at step 476.

Figure 6:
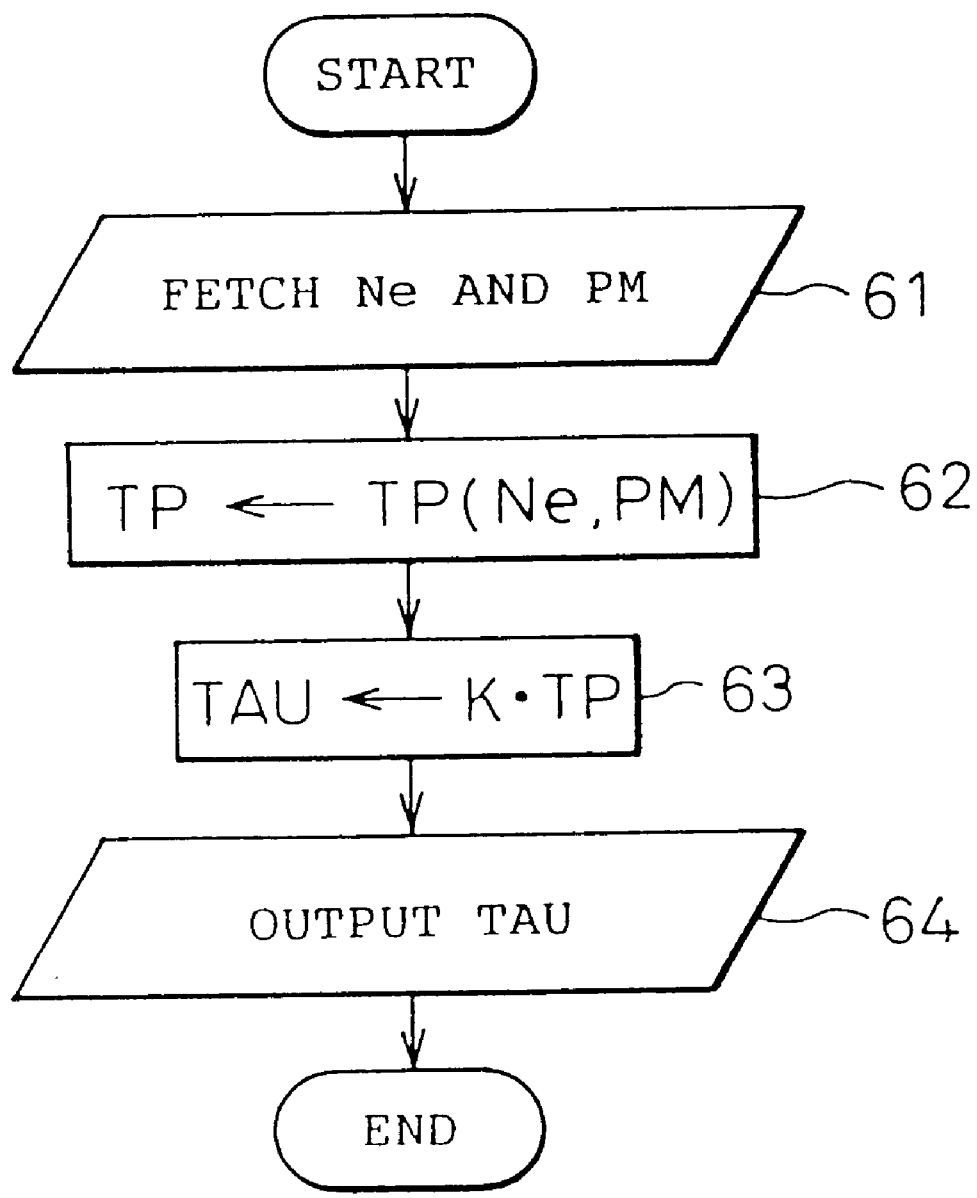
FIG. 6 is a flowchart of a fuel injection routine.

FIG. 6 is a flowchart of a fuel injection routine for determining the amount of fuel injected from the fuel injection valve 117, that is, the opening time of the fuel injection valve 117, and the rotational speed Ne of the gasoline engine and the intake pipe pressure PM are fetched at step 61.

The basic fuel injecting period TP is calculated as a function of the rotational speed Ne of the gasoline engine and the intake manifold pressure PM.

$$TP \leftarrow TP (Ne, PM)$$

Note, the basic fuel injecting period TP is determined as the opening period of the fuel injection valve for supplying the amount of fuel required for burning at the stoichiometric air-fuel ratio.

At step 63, the basic fuel injecting period TP is multiplied by the air-fuel ratio correction coefficient K to calculate the fuel injecting period TAU.

$$TAU \leftarrow K \cdot TP$$

Consequently, as long as the air-fuel ratio correction coefficient K is set to $K_L$, the gasoline engine is in a lean burning state, while as long as it is set to $K_R$, the gasoline engine is in a rich burning state.

Figure 7:
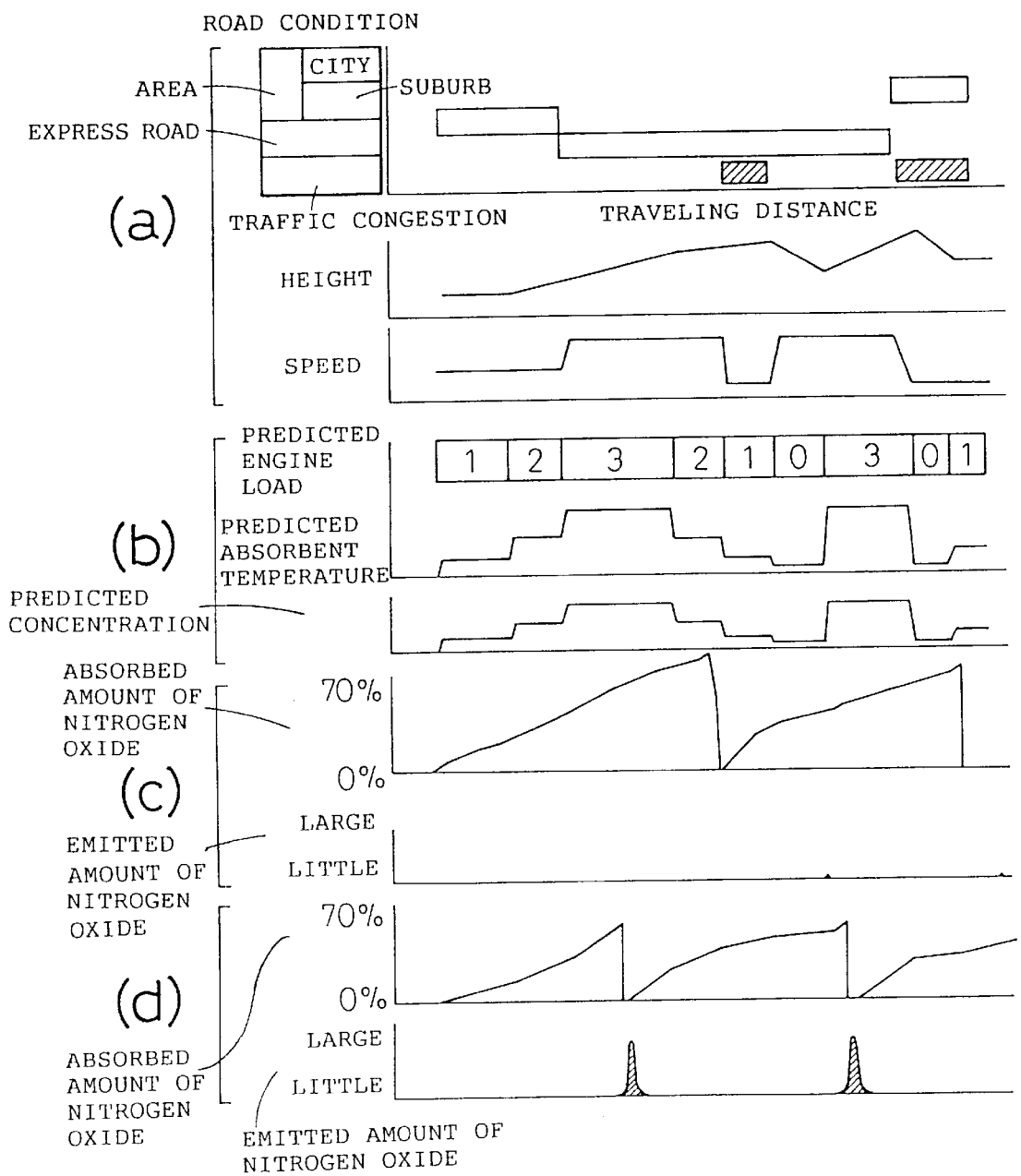
FIG. 7 is a diagram for explaining the effects of the invention.

FIG. 7 is a diagram for explaining the effects of the present invention when it is applied to the gasoline engine. The abscissa denotes the time.

- (a) shows the information of the route and the traffic congestion forecast obtained from the car navigation system 141 and the vehicle information and communication system receiver 142 and the vehicle speed predicted based on the above information.
- (b) shows the load of the gasoline engine, the absorbent temperature and the concentration of nitrogen oxide predicted by the control unit 13.
- (c) shows the amount of the nitrogen oxide absorbed in the absorbent and the amount of the nitrogen oxide released from the absorbent predicted by the control unit 13.

Namely, the regeneration operation is postponed in the exhaust gas purifying system until the absorbent temperature moves into the temperature range where nitrogen oxide can never be emitted as long as the absorbent retains its absorbing power while the absorbent temperature is in the temperature range where nitrogen oxide may be emitted when it is determined that the amount of nitrogen oxide absorbed in the absorbent becomes a maximum.

- (d) shows the regeneration operation performed by the conventional exhaust gas purifying system of the gasoline engine. Namely, when it is determined that the amount of the nitrogen oxide absorbed in the absorbent becomes a maximum, the regeneration operation is carried out regardless of the absorbent temperature. When the absorbent temperature is high, therefore, nitrogen oxide is unavoidably emitted into the air.

Therefore, in the exhaust purifying system of the gasoline engine according to the present invention, not only the number of regeneration operations is reduced but also the emission of the nitrogen oxide from the vehicle is suppressed.

Figure 8:
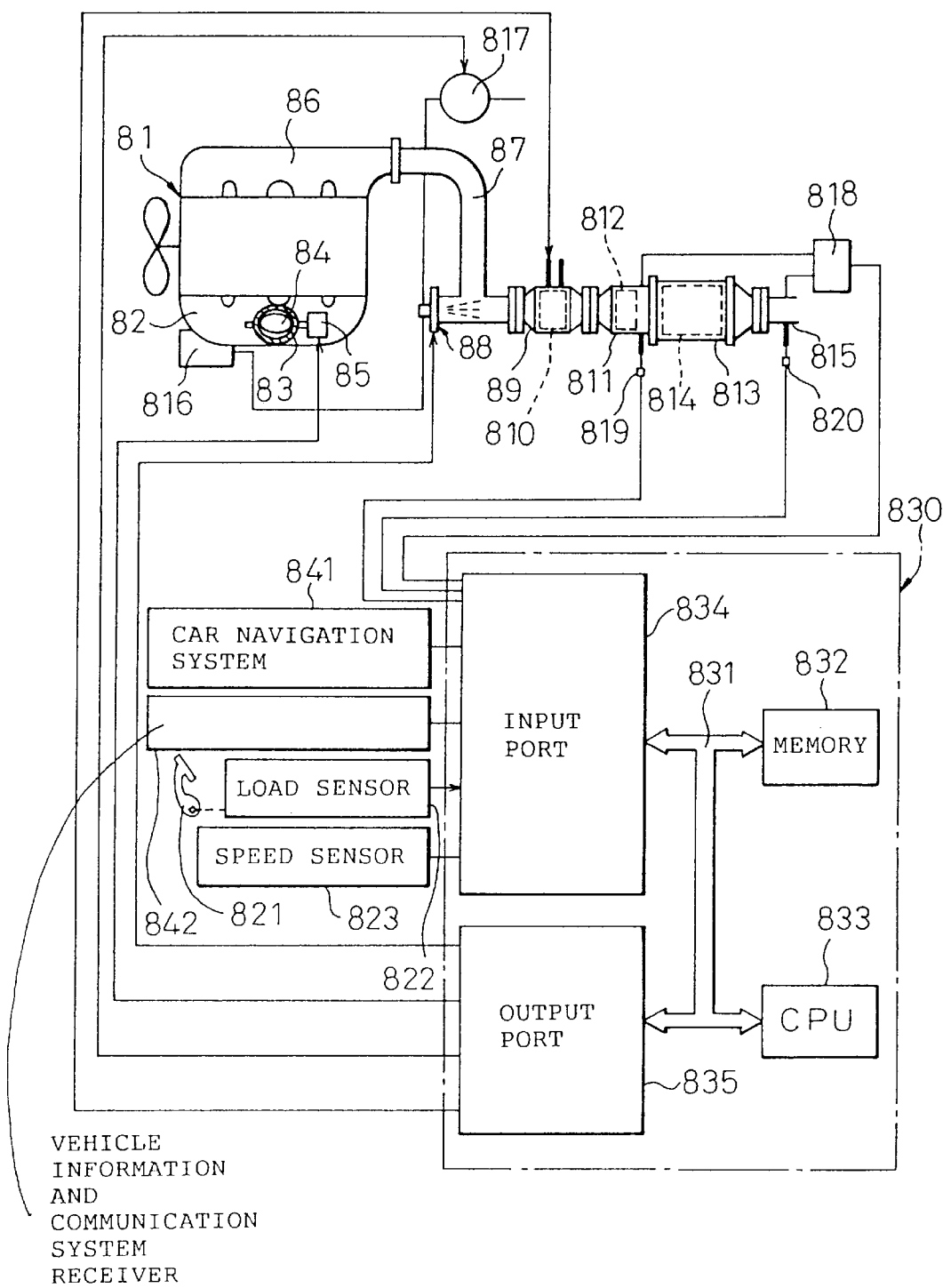
FIG. 8 is a configuration diagram showing an embodiment of an exhaust gas purifying system for a diesel engine according to the invention.

FIG. 8 is a configuration diagram of an embodiment when the present invention is applied to a diesel engine. Numeral 81 designates a diesel engine, numeral 82 an intake manifold, numeral 83 an intake duct coupled to the confluence of the intake manifold 82, numeral 84 a throttle valve arranged in the intake duct 83, numeral 85 an actuator for driving the throttle valve 84, numeral 86 an exhaust manifold, numeral 87 an exhaust pipe, numeral 88 a light oil supply unit, numeral 89 a casing for housing an electric heater 810, numeral 811 a catalyst converter which contains oxidization catalyst 812, numeral 813 a filter casing which contains a honeycomb particulate filter 814, and numeral 815 an exhaust pipe. The light oil supply unit 88 is connected to a light oil supply pump 816 and a secondary air supply pump 817 driven by the diesel engine, and the light oil and the secondary air are supplied into the exhaust pipe 87 from the light oil supply unit 88 if necessary. The electric heater 810 can alternatively be installed in the oxidization catalyst 812.

The control unit 830 is a microcomputer system including a memory 832, a CPU 833, an input port 834 and an output port 835 interconnected by a bus 831. A differential pressure sensor 818 for generating a signal proportional to the pressure difference between the upstream side and the downstream side of the particulate filter 814 is installed on the particulate filter 814, and the differential pressure sensor 818 is connected to the input port 834. Further, a pair of temperature sensors 819, 820 are installed for detecting the exhaust gas temperature on the upstream and downstream sides, and these temperature sensors 819, 820 are also connected to the input port 834.

Also, the accelerator pedal 821 is equipped with a load sensor 822 for generating a signal proportional to the amount of depression of the accelerator pedal 821, and the load sensor 822 is connected to the input interface 834. Further, an engine speed sensor 823 for outputting pulses indicating the rotational speed Ne of the internal combustion engine is also connected to the input sensor.

On the other hand, the actuator 85, the light oil supply unit 88, the electric heater 810 and the secondary air supply pump 817 are connected to the output port 835.

Further, in order to fetch the information of the vehicle operating condition, the car navigation system 841 and the vehicle information and communication system receiver 842 are connected to the input port 834.

Because the oxidization catalyst 812 has the absorbent, if the exhaust gas contains a large amount of nitrogen monoxide in the diesel engine or the like, the nitrogen monoxide contained in the exhaust gas is absorbed when the temperature of the exhaust gas is low, while the nitrogen dioxide absorbed in the nitrogen oxide absorbent is released when the temperature of the exhaust gas is comparatively high.

Therefore, it becomes possible to remove the particulates caught in the particulate filter 814 which is arranged at the downstream side of the engine with the nitrogen dioxide released from the oxidization catalyst when the temperature of the exhaust gas is relatively high though it is not enough high to cause spontaneous firing.

The operation of the exhaust gas purifying system shown in FIG. 9 will be described below. The throttle valve 84 is fully open and the light supply unit 88 and the electric heater 810 are stopped under the normal operating condition.

Figure 9:
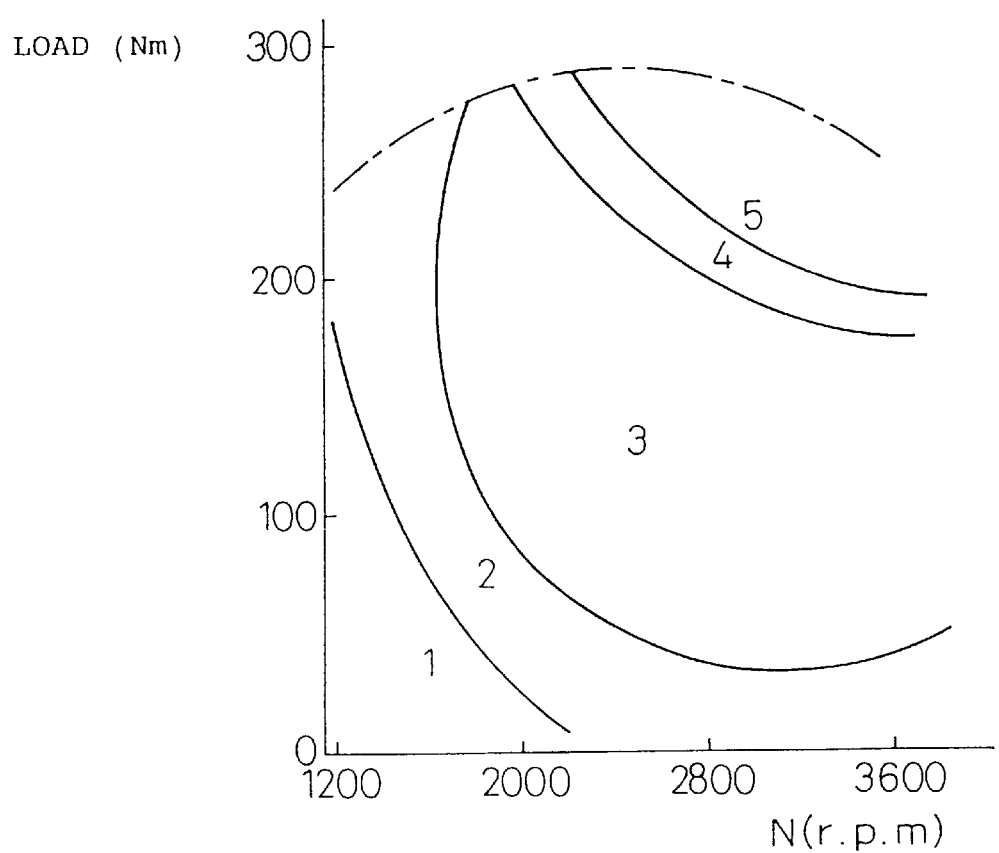
FIG. 9 is a diagram showing an operating area for removing particulates.

FIG. 9 is a diagram for explaining the operating zone for removing the particulates. The ordinate denotes the engine load, and the abscissa the engine speed.

The conversion rate from nitrogen monoxide to nitrogen dioxide in the oxidization catalyst 812 increases when the exhaust gas temperature Tg is in the range of about 230° C. to 450° C., that is, when the operating zone is "3". In this operating area, the particulates react with the nitrogen dioxide and are removed by burning without forcibly raising the exhaust gas temperature by the light burner 88 or the like.

When the operating condition belongs to the operating zone "5", the particulates burn spontaneously without reaction with nitrogen dioxide.

Conversely in the operating zones "1" or "2", both the conversion rate from nitrogen monoxide to nitrogen dioxide and the exhaust gas temperature are so low that the particulates cannot be removed by burning.

Further, in the operating zone "4", the conversion rate from nitrogen monoxide to nitrogen dioxide is low and the exhaust gas temperature is not so high that the particulates burns spontaneously.

In the operating zone "4", therefore, it is possible to burn and remove the particulates by slightly closing the throttle valve 84 to raise the exhaust gas temperature.

In the operating zone "2", the particulates can be removed by raising the exhaust gas temperature with the electric heater 810 or by slightly closing the throttle valve 84.

Further, in the operating zone "1", the particulates can be removed by burning light oil, using the electric heater 810 and the light oil supply unit 88, to raise the exhaust gas temperature.

That is, in the operating zones "3" or "5", it is possible to perform the regeneration operation for the particulate filter 814 without deteriorating the fuel consumption rate, whereas the regeneration operation for the particulate filter 814 in the remaining operating zones deteriorates the fuel consumption rate due the use of the electric heater 10, the light oil supply unit 88 or the closing of the throttle valve 84.

Therefore, it is necessary to make a schedule to perform the regeneration of the particulate filter 814 in the operating zones "3" or "5".

Figure 10:
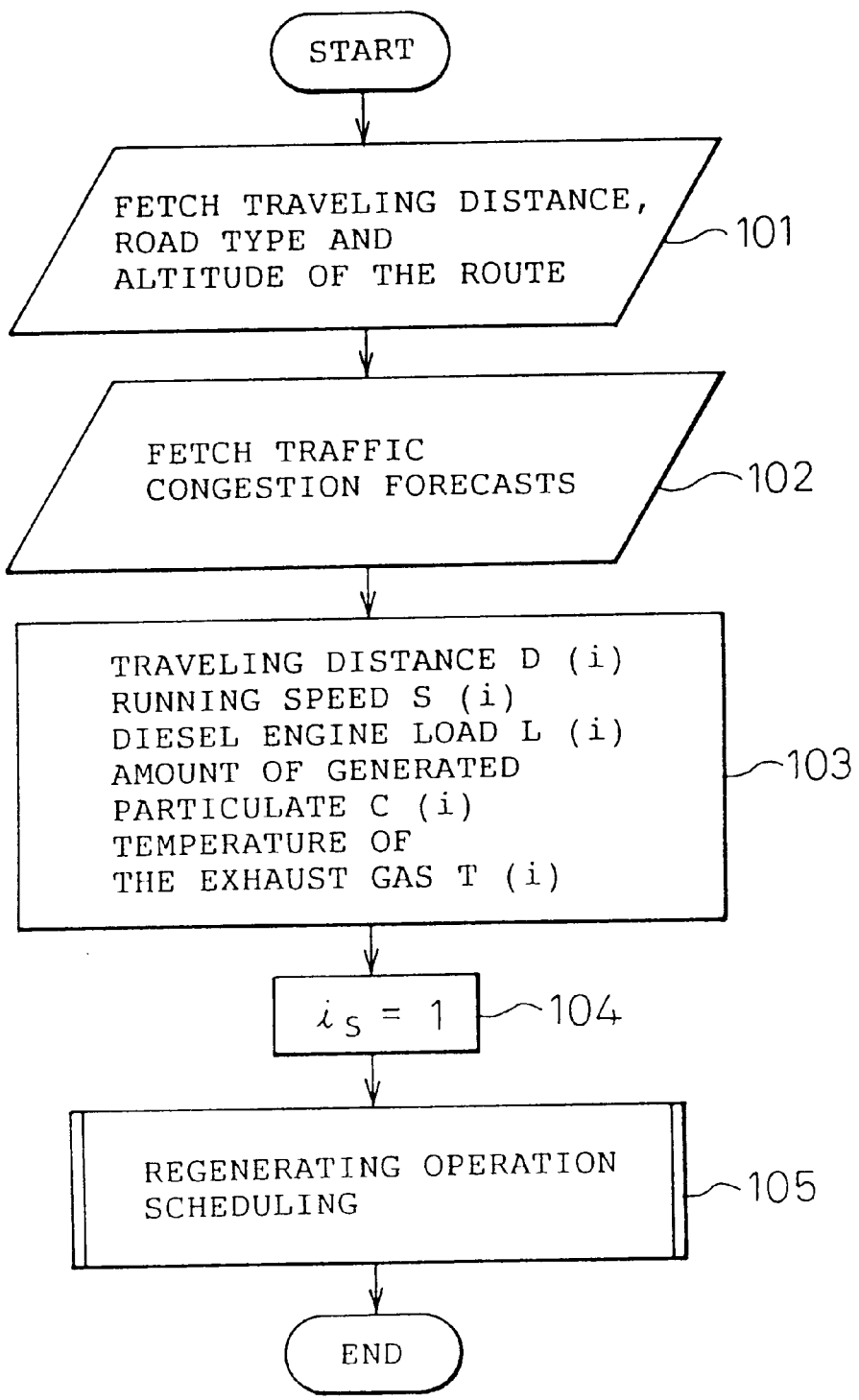
FIG. 10 is a flowchart of a scheduling routine for an exhaust gas purifying system of a diesel engine.

FIG. 10 is a flowchart of a second scheduling routine executed by the control unit 13 before the vehicle begins running, and the information of the route searched by the car-navigation system 841, such as traveling distance, road type (whether express road or normal road), altitude, etc., is fetched at step 101.

The traffic congestion forecast, traffic control information, etc. received by the vehicle information and communication system receiver 842 at step 102.

At step 103, the route to the destination are divided into $i_{max}$ sections according to the information and the traffic congestion forecast, and then a traveling distance D(i), a running speed S(i), a load of the diesel engine L(i), an amount of generated particulate C(i), a temperature of the exhaust gas Tg(i), etc. are predicted for each section i ($1 \leq i \leq i_{max}$).

At step 104, in order to determine the regeneration timing of the exhaust gas purifying system for all sections, a section index $i_s$ is set to "1" as the initial value, and the regeneration scheduling routine for the particulate filter is executed at step 105 to terminate the routine.

Figure 11:
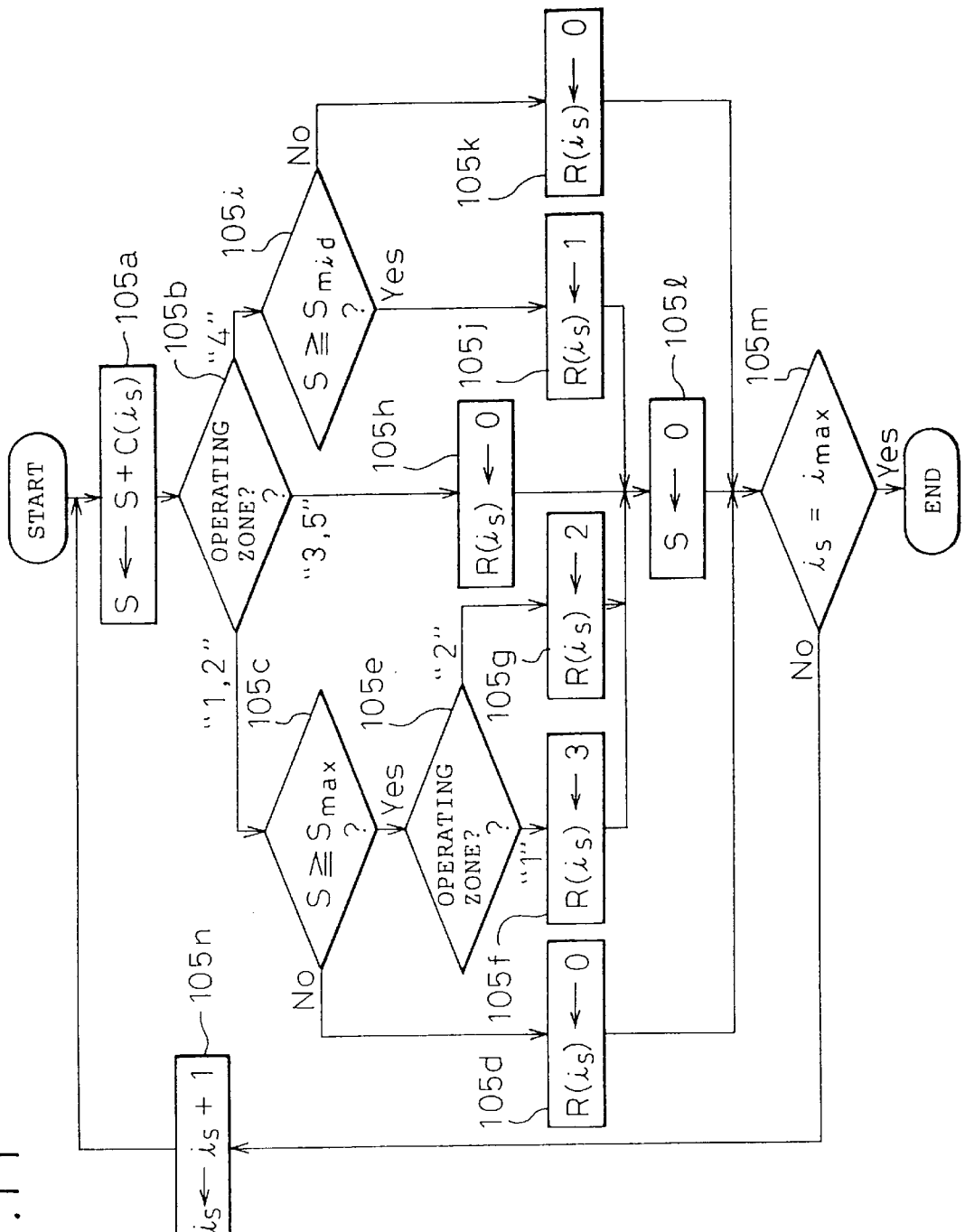
FIG. 11 is a flowchart of a second regeneration operation scheduling routine.

FIG. 11 is a flowchart of a particulate filter regeneration scheduling routine executed at step 105. At step 105a, the amount of particulate $C(i_s)$ generated while the vehicle is running in the current section "$i_s$" is added to the amount of particulate S trapped by the particulate filter 814 after the vehicle has completed running at the previous section to determine the amount of particulate S trapped when the vehicle has completed running at the section "$i_s$", and the operating zone of the section "$i_s$" is determined at step 105b.

When it is determined that the operating zone of the running section "$i_s$" is "1" or "2" at step 105b, the control proceeds to step 105c where it is determined whether or not the trapped amount of particulate S is larger than the maximum amount $S_{max}$ (for example, 120%).

When the determination at step 105c is negative, that is, when the particulate filter 814 has a margin of trapping power, the regeneration operation flag $R(i_s)$ for the section "$i_s$" is set to "0" which indicates that any regeneration operations such as burning of the light oil, heating with the electric heater or closing of the throttle valve are not performed.

When the determination at step 105c is affirmative, that is, when the particulate filter 814 has no margin of trapping power, it is determinated whether or not the operating zone corresponding to the section "$i_s$" is "1" or "2". If the operating zone is "1", the regeneration operation flag $R(i_s)$ is set to "3" which indicates that the heating by burning of light oil and the heating by the electric heater are used at the same time at step 105f. When the operating zone is "2", on the other hand, the regeneration operation flag $R(i_s)$ is set to "2" which indicates that the heating by the electric heater and closing of the throttle valve are used at the same time.

When the determination at step 105b is that the operating zone for the section "$i_s$" is "3" or "5", the control proceeds to step 105h where the regeneration operation flag $R(i_s)$ for section "$i_s$" is set to "0" because the particulates can be removed without a regeneration operation.

When the determination at step 105b is that the operating zone for the section is "4", the control proceeds to step 105i where it is determined whether or not the trapped amount of particulate S is larger than a middle amount $S_{mid}$ (for example, 100%).

When the determination at step 105i is affirmative, that is, when the trapped amount of particulate S is not less than the middle amount $S_{mid}$, the regeneration operation of the particulate filter 814 is possible without deteriorating the fuel consumption rate in the operating zone "4". In order to perform the regeneration operation beforehand, the regeneration operation flag $R(i_s)$ is set to "1" which indicates that the throttle valve is slightly throttled.

When the determination at step 105i is negative, that is, when the trapped amount of particulate S is less than the middle amount $S_{mid}$, the regeneration operation flag $R(i_s)$ for the section "$i_s$" is set to "0" which indicates that the regeneration operation is not performed because the particulate filter 814 has a margin of trapping power.

After completing the processing at steps 105f, 105g, 105h and 105i, the control proceeds to step 105m after the amount of trapped particulates S is reset at step 105l.

After completing the processing at steps 105d and 105k, the control proceeds directly to step 105m without resetting the amount of trapped particulate S because the regeneration operation of the particulate filter is not performed.

It is determined whether or not the prediction for all sections at step 105m, that is, whether or not the section index "$i_s$" has reached the maximum value $i_{max}$.

When the determination at step 105m is negative, the control returns to step 105a after the section index "$i_s$" is incremented at step $105_n$. When the determination at step 105m is affirmative, in contrast, this routine is directly terminated.

Figure 12:
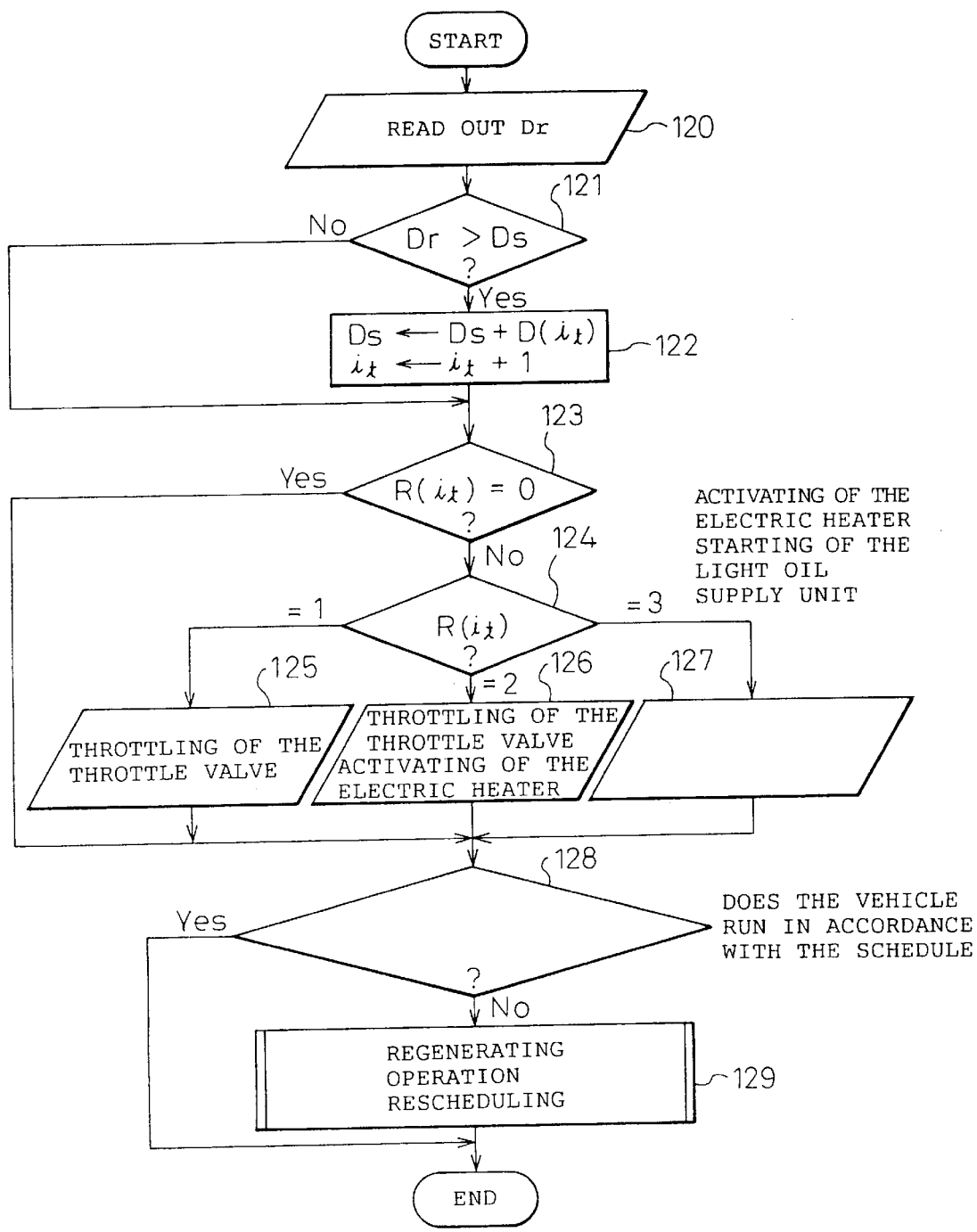
FIG. 12 is a flowchart of a second regeneration execution routine.

FIG. 12 is a flowchart of a second regeneration operation routine executed after the vehicle begins running. This routine is executed as an interrupt routine every predetermined interval.

The actual traveling distance after the vehicle begins running is read out, for example, from the trip meter at step 120, and it is determined that the actual traveling distance is larger than the predicted traveling distance $D_s(i_t)$ up to the section $i_t$. The section $i_t$ and the predicted distance $D_s$ are assumed to be set to "0" in the initialization routine which not shown.

When the determination at step 121 is affirmative, that is, when the section $i_t$ has been completely covered, the control proceeds to step 123 after the predicted distance $D_s$ is renewed with the following equation and the section index $i_t$ is incremented at step 122.

$$D_s \leftarrow D_s + D(i_t)$$
$$i_t \leftarrow i_t + 1$$

Note, when the determination at step 121 is negative, the control proceeds directly to step 123.

It is determined whether or not the regeneration execution flag $R(i_t)$ is "0" at step 123 and, when the determination is affirmative, the control proceeds to step 128 without executing any process.

When the determination at step 123 is negative, the control proceeds to step 124 for judging the value of the regeneration execution flag $R(i_t)$.

When it is determined that the value of the regeneration execution flag R(i$_t$) is "1" at step 124, the control proceeds to step 128 after slightly closing the throttle valve 84 at step 125.

When it is determined that the value of the regeneration execution flag R(i$_t$) is "2" at step 124, the control proceeds to step 128 for slightly closing the throttle valve 84 and activating the electric heater 810 at step 126.

When it is determined that the value of the regeneration execution flag R(i$_t$) is "3" at step 124, the control proceeds to step 128 after the electric heater 810 is activated and light oil is supplied to the exhaust pipe 87 from the light oil supply unit 88 at step 127.

At step 128, it is determined whether or not the vehicle is being driven in accordance with the schedule calculated in the regeneration scheduling routine.

This determination can be done by determining whether or not the actual values of the speed, the diesel engine load (for example the depressed amount of the accelerator pedal) or the exhaust gas temperature agree with the predicted values of the speed, the diesel engine load or the exhaust gas temperature, and within the predetermined limits.

When the determination at step 128 is affirmative, that is, when the vehicle is driven in accordance with the schedule, this routine is directly terminated.

When the determination at step 128 is negative, that is, when the vehicle is not driven in accordance with the schedule, this routine is terminated after the regeneration operation is rescheduled at step 129.

The regeneration operation can be rescheduled by re-executing the scheduling routine shown in FIG. 11.

Figure 13:
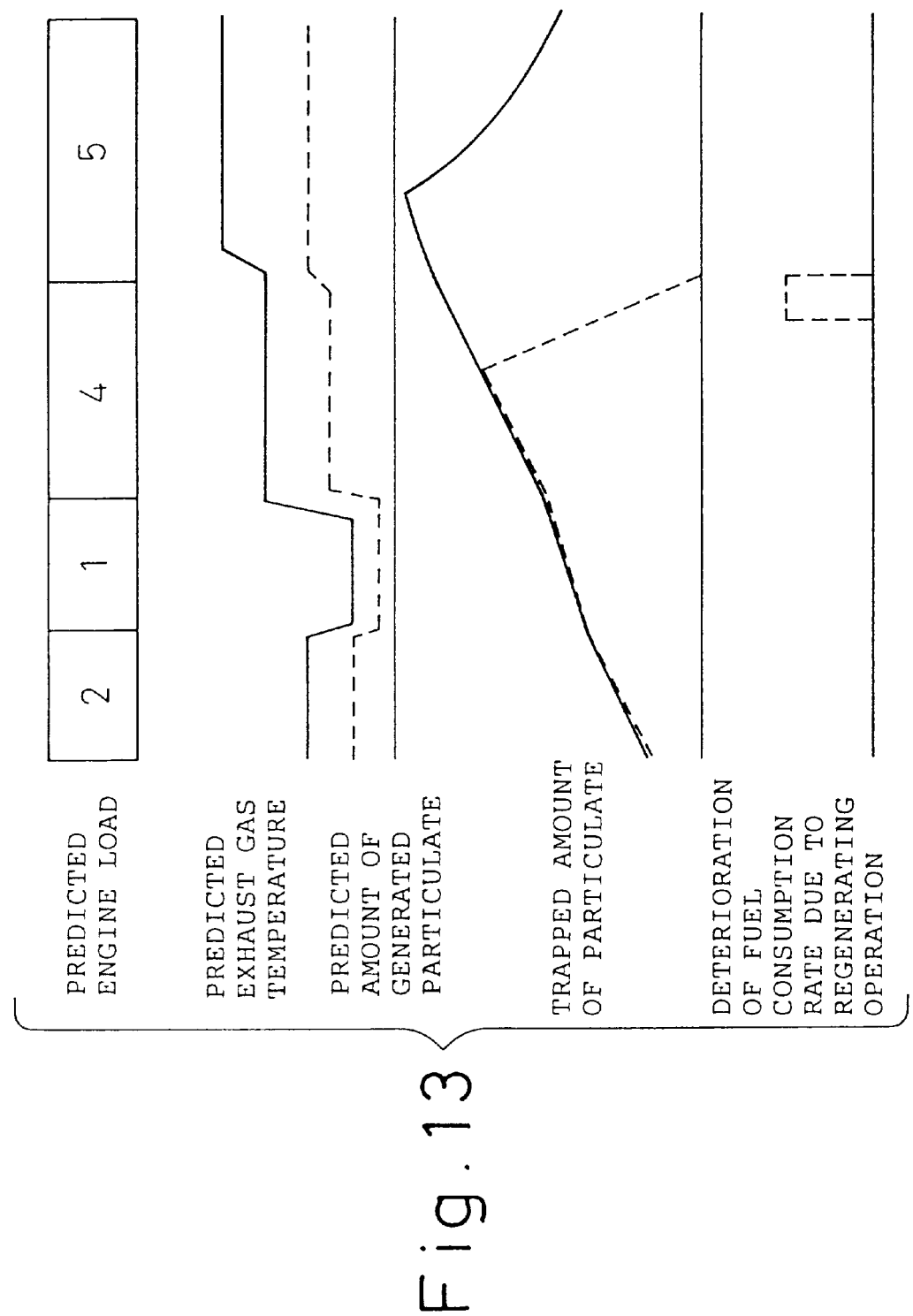
FIG. 13 is a diagram for explaining the effects in the case where the exhaust gas purifying system is a particulate filter.

FIG. 13 is a diagram for explaining the effects of the invention applied to the particulate filter of the diesel engine. The abscissa represents the time, and the ordinates represent the predicted engine load, the predicted exhaust gas temperature (solid line) and the predicted amount of generated particulates, the amount of trapped particulates and the deteriorating degree of fuel consumption rate.

In respect of the amount of trapped particulates and the deteriorating degree of fuel consumption rate, the solid line indicates when the present invention is applied and the dashed line indicates when the prior art is applied.

Specifically, according as the predicted engine load changes as "2"→"1"→"4"→"5", the predicted exhaust gas temperature and the predicted amount of generated particulates also change. The numerals in the predicted engine load indicate the operating zone of FIG. 9.

When no regeneration operation is scheduled, as in the prior art, it is necessary to burn off particulates by closing the throttle valve 94 to raise the temperature of the exhaust gas, because the amount of particulates trapped by the particulate filter reach 100% when the predicted engine load is "4". In this case, the fuel consumption rate is deteriorated as the result of closing the throttle valve 94.

Conversely, when the present invention is applied, the regeneration operation is not executed because the particulate filter has a margin against the maximum trapping power, for example, 120%, even though the amount of trapped particulates reaches 100% when the predicted engine load is "4".

At the next section, the operating zone becomes "5" and the particulate is naturally burned off because the exhaust gas temperature becomes high. In this case, the throttle valve 94 is not closed, and therefore the fuel consumption rate is not deteriorated.

What is claimed is:

1. An exhaust gas purifying system for an internal combustion engine, comprising:

means for trapping polluting components of exhaust gas emitted from the internal combustion engine;

means for regenerating the trapping means by removing the polluting components trapped in the trapping means;

means for predicting a future running condition of a vehicle in which the engine is mounted;

means for predicting a property of the exhaust gas based on the predicted future running condition;

means for determining a timing at which the trapping means should be regenerated by the removal means in accordance with the predicted exhaust gas property; and means for executing regenerating of the trapping means by the removing means at the timing determined by the regeneration timing determining means.

2. An exhaust gas purifying system according to claim 1, wherein:

the exhaust gas property predicting means is an exhaust gas temperature predicting means for predicting the temperature of the exhaust gas emitted from said internal combustion engine based on the vehicle running condition predicted by said running condition predicting means.

3. An exhaust gas purifying system according to claim 2, wherein:

the trapping means is a catalyst for trapping nitrogen oxide in the exhaust gas when the exhaust gas is in a lean state:

the removing means enriches the exhaust gas to regenerate the catalyst by releasing nitrogen oxide trapped in the catalyst;

the regeneration timing determining means determines the regeneration timing of the catalyst based on the predicted future exhaust gas temperature; and the regeneration executing means enriches the exhaust gas at the enriching timing determined by the enriching timing determining means.

4. An exhaust gas purifying system according to claim 3, wherein the enriching timing determining means determines the regeneration timing to coincide with a time point at which the exhaust gas property predicting means reaches a predetermined regeneration threshold.

5. An exhaust gas purifying system according to claim 3, wherein the enriching timing determining means determines the enriching timing determining means determines the regeneration timing to coincide with a time point at which the exhaust gas property predicting means is lower than a predetermined regeneration threshold.

6. An exhaust gas purifying system according to claim 1, wherein the trapping means is a particulate filter for trapping particulate emitted from the internal combustion engine;

the removing means regenerates the particulate filter by burning off particulate trapped therein;

the regeneration timing determining means determines the regeneration timing based on the predicted future exhaust gas property; and the regeneration executing means executes regeneration of the particulate filter at the particulate filter regenerating timing determined by the regenerating timing determining means.

7. An exhaust gas purifying system according to claim 6, wherein the exhaust gas property predicting means predicts a temperature of the exhaust gas based the predicted running condition.

8. An exhaust gas purifying system according to claim 7, wherein the regeneration timing determined by the regeneration timing determining means determines is a time at which the predicted exhaust gas temperature is lower than a predetermined regeneration threshold.

9. An exhaust gas purifying system according to claim 6, wherein the regeneration timing determined by the regeneration timing determining means determines is a time at which the predicted exhaust gas property reaches a predetermined regeneration threshold.

10. An exhaust gas purifying system according to claim 6, wherein the particulate filter regenerating means is at least one of a means for slightly closing a throttle valve of the engine, an electric heater for heating the exhaust gas and means for burning fuel in the exhaust gas to heat the exhaust gas.

11. An exhaust gas purifying system according to claim 6, wherein:

the particulate filter contains a catalyst for naturally burning off particulate; and when the exhaust gas temperature is higher than about 600° C., the regeneration executing means executes regeneration of the particulate filter by natural burning without activating the particulate filter regenerating means.

12. An exhaust gas purifying system according to claim 6, further comprising:

an oxidization catalyst arranged upstream of the particulate filter for absorbing nitrogen monoxide contained in the exhaust gas when the exhaust gas temperature is lower than 250° C. and for converting nitrogen monoxide into nitrogen dioxide to release nitrogen monoxide when the exhaust gas temperature is between about 250° C. and 400° C.;

wherein, when the exhaust gas temperature is between about 250° C. and 400° C., the regeneration executing means executes regeneration of the particulate filter by oxidizing particulate via the nitrogen dioxide without operating particulate filter regenerating means.

13. An exhaust gas purifying system according to claim 1, further comprising:

means for judging whether the predicted running condition agrees with an actual running condition and whether the predicted exhaust gas property agrees with an actual exhaust gas property; and means for re-predicting, when the agreement judging means judges that the predicted running condition does not agree with the actual running condition, the future vehicle running condition and re-predicting the future exhaust gas property based on the re-predicted running condition.

* * * * *